United States Patent
Drutsa

(10) Patent No.: US 11,416,773 B2
(45) Date of Patent: Aug. 16, 2022

(54) METHOD AND SYSTEM FOR DETERMINING RESULT FOR TASK EXECUTED IN CROWD-SOURCED ENVIRONMENT

(71) Applicant: YANDEX EUROPE AG, Lucerne (CH)

(72) Inventor: Alexey Valerevich Drutsa, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 402 days.

(21) Appl. No.: 16/777,790

(22) Filed: Jan. 30, 2020

(65) Prior Publication Data
US 2020/0380410 A1 Dec. 3, 2020

(30) Foreign Application Priority Data
May 27, 2019 (RU) .................. 2019116267

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC .......... G06N 20/00; G06N 5/04; G06N 5/022; G06N 20/20; G06Q 10/063112
See application file for complete search history.

(56) References Cited

U.S. PATENT DOCUMENTS

| | | |
|---|---|---|
| 6,560,597 B1 | 5/2003 | Dhillon et al. |
| 7,366,705 B2 | 4/2008 | Zeng et al. |
| 7,693,738 B2 | 4/2010 | Guinta et al. |
| (Continued) | | |

FOREIGN PATENT DOCUMENTS

| | | |
|---|---|---|
| CN | 103914478 A | 7/2014 |
| CN | 104463424 B | 3/2015 |
| (Continued) | | |

OTHER PUBLICATIONS

Yu, "Software Crowdsourcing Task Allocation Algorithm Based on Dynamic Utility", IEEE Access ( vol. 7) pp. 33094-33106, Published Mar. 13, 2019.
(Continued)

*Primary Examiner* — J. Brant Murphy
(74) *Attorney, Agent, or Firm* — BCF LLP

(57) ABSTRACT

A method and system for completing a task executed in a crowd-sourced environment is disclosed. The method comprises, at a training phase: transmitting a training task to a plurality of users; acquiring a plurality of training results responsive to the training task; acquiring a respective user activity history associated with each user; for each of the plurality of training results, assigning a label value; generating a set of triples of training data; and training a machine learning algorithm, the training including, determining for each triples of data a set of features representative of a property of the triples of training data; and generating an inferred function based on the set of features, the inferred function being configured to determine a error parameter of a given result received from a given user to a given task.

20 Claims, 6 Drawing Sheets

(56) References Cited

U.S. PATENT DOCUMENTS

| | | | |
|---|---|---|---|
| 7,747,083 B2 | 6/2010 | Tawde et al. | |
| 8,266,130 B2 | 9/2012 | Jones et al. | |
| 8,498,892 B1 | 7/2013 | Cohen et al. | |
| 8,554,605 B2 | 10/2013 | Oleson et al. | |
| 8,626,545 B2 | 1/2014 | Van et al. | |
| 9,268,766 B2 | 2/2016 | Bekkerman | |
| 9,330,071 B1 | 5/2016 | Ahmed et al. | |
| 9,584,540 B1 | 2/2017 | Chan et al. | |
| 9,594,944 B2 | 3/2017 | Kompalli et al. | |
| 9,767,419 B2 | 9/2017 | Venanzi et al. | |
| 9,911,088 B2 | 3/2018 | Nath et al. | |
| 10,061,848 B2 | 8/2018 | Basu et al. | |
| 10,095,688 B1* | 10/2018 | Schilling | G06F 16/2455 |
| 10,162,734 B1 | 12/2018 | Podgorny et al. | |
| 10,445,671 B2 | 10/2019 | Dubey et al. | |
| 10,685,329 B2 | 6/2020 | Taylor et al. | |
| 10,978,056 B1* | 4/2021 | Challa | G06F 16/3344 |
| 2002/0032591 A1 | 3/2002 | Mahaffy et al. | |
| 2003/0154181 A1 | 8/2003 | Liu et al. | |
| 2007/0226207 A1 | 9/2007 | Tawde | |
| 2007/0260601 A1 | 11/2007 | Thompson et al. | |
| 2008/0027913 A1 | 1/2008 | Chang et al. | |
| 2010/0153156 A1 | 6/2010 | Guinta et al. | |
| 2010/0293026 A1 | 11/2010 | Vojnovic et al. | |
| 2011/0173183 A1 | 7/2011 | Dasdan et al. | |
| 2011/0313801 A1 | 12/2011 | Biewald et al. | |
| 2012/0005131 A1 | 1/2012 | Horvitz et al. | |
| 2012/0131572 A1 | 5/2012 | Shae et al. | |
| 2012/0150579 A1 | 6/2012 | De Wit et al. | |
| 2012/0265573 A1 | 10/2012 | Van et al. | |
| 2013/0006717 A1 | 1/2013 | Oleson et al. | |
| 2013/0029769 A1 | 1/2013 | Lee et al. | |
| 2013/0096968 A1 | 4/2013 | Van Pelt et al. | |
| 2013/0111488 A1 | 5/2013 | Gatti et al. | |
| 2013/0159292 A1 | 6/2013 | Larlus et al. | |
| 2013/0231969 A1 | 9/2013 | Van et al. | |
| 2014/0122188 A1 | 5/2014 | Van Pelt et al. | |
| 2014/0172767 A1 | 6/2014 | Chen et al. | |
| 2014/0278634 A1 | 9/2014 | Horvitz et al. | |
| 2014/0343984 A1 | 11/2014 | Shahabi et al. | |
| 2014/0355835 A1 | 12/2014 | Rodriguez-Serrano et al. | |
| 2015/0004465 A1 | 2/2015 | Basu et al. | |
| 2015/0074033 A1 | 3/2015 | Shah et al. | |
| 2015/0086072 A1* | 3/2015 | Kompalli | G06V 40/161 382/103 |
| 2015/0178659 A1 | 6/2015 | Dai et al. | |
| 2015/0213392 A1 | 7/2015 | Kittur et al. | |
| 2015/0254593 A1 | 9/2015 | Ramos et al. | |
| 2015/0254596 A1 | 9/2015 | Nayar et al. | |
| 2015/0254785 A1* | 9/2015 | Yang | G06Q 50/01 705/26.41 |
| 2015/0262111 A1 | 9/2015 | Yu et al. | |
| 2015/0317582 A1 | 11/2015 | Nath et al. | |
| 2015/0347519 A1* | 12/2015 | Hornkvist | G06F 16/2457 707/722 |
| 2015/0356488 A1 | 12/2015 | Eden et al. | |
| 2015/0356489 A1* | 12/2015 | Kazai | G06Q 10/06398 705/7.42 |
| 2015/0363741 A1 | 12/2015 | Chandra et al. | |
| 2016/0041849 A1 | 2/2016 | Naveh et al. | |
| 2016/0100000 A1 | 4/2016 | Dey et al. | |
| 2016/0132815 A1 | 5/2016 | Itoko et al. | |
| 2016/0140477 A1 | 5/2016 | Karanam et al. | |
| 2016/0210570 A1 | 7/2016 | Lee et al. | |
| 2016/0232221 A1 | 8/2016 | McCloskey et al. | |
| 2016/0035785 A1 | 12/2016 | Fan et al. | |
| 2017/0011077 A1 | 1/2017 | Kypreos et al. | |
| 2017/0024931 A1 | 1/2017 | Sheffer et al. | |
| 2017/0046794 A1 | 2/2017 | Shukla et al. | |
| 2017/0052761 A1 | 2/2017 | Gunshor et al. | |
| 2017/0061341 A1 | 3/2017 | Haas et al. | |
| 2017/0061356 A1 | 3/2017 | Haas et al. | |
| 2017/0061357 A1 | 3/2017 | Dubey et al. | |
| 2017/0103451 A1 | 4/2017 | Alipov et al. | |
| 2017/0154313 A1 | 6/2017 | Duerr et al. | |
| 2017/0185944 A1 | 6/2017 | Volkov et al. | |
| 2017/0200101 A1 | 7/2017 | Kumar et al. | |
| 2017/0220973 A1 | 8/2017 | Byham et al. | |
| 2017/0228749 A1 | 8/2017 | Larvol et al. | |
| 2017/0293859 A1 | 10/2017 | Gusev et al. | |
| 2017/0309193 A1 | 10/2017 | Joseph et al. | |
| 2017/0353477 A1 | 12/2017 | Faigon et al. | |
| 2017/0372225 A1 | 12/2017 | Foresti et al. | |
| 2018/0005077 A1 | 1/2018 | Wang et al. | |
| 2018/0144283 A1* | 5/2018 | Freitas | G06Q 10/06311 |
| 2018/0144654 A1 | 5/2018 | Olsen | |
| 2018/0196579 A1 | 7/2018 | Standefer et al. | |
| 2018/0331897 A1* | 11/2018 | Zhang | G06N 20/00 |
| 2018/0357286 A1* | 12/2018 | Wang | G06F 16/243 |
| 2019/0258985 A1 | 8/2019 | Guastella et al. | |
| 2019/0318291 A1 | 10/2019 | Diriye et al. | |
| 2020/0327582 A1 | 10/2020 | Fedorova et al. | |
| 2020/0372338 A1 | 11/2020 | Woods et al. | |

FOREIGN PATENT DOCUMENTS

| | | | |
|---|---|---|---|
| CN | 105608318 | A | 5/2016 |
| CN | 106203893 | A | 12/2016 |
| CN | 106327090 | A | 1/2017 |
| CN | 106446287 | A | 2/2017 |
| CN | 106557891 | A | 4/2017 |
| CN | 107767055 | A | 3/2018 |
| CN | 107767058 | A | 3/2018 |
| CN | 107909262 | A | 4/2018 |
| CN | 104794573 | B | 5/2018 |
| CN | 109272003 | A | 1/2019 |
| CN | 109670727 | A | 4/2019 |
| CN | 110020098 | A | 7/2019 |
| CN | 110503396 | A | 11/2019 |
| CN | 110909880 | A | 3/2020 |
| CN | 110928764 | A | 3/2020 |
| CN | 111191952 | A | 5/2020 |
| CN | 111291973 | A | 6/2020 |
| CN | 111723930 | A | 9/2020 |
| EP | 3438897 | A1 | 2/2019 |
| KR | 102155790 | B1 | 9/2020 |
| KR | 102156582 | B1 | 9/2020 |
| RU | 2672171 | C1 | 11/2018 |
| WO | 0010296 | A2 | 2/2000 |
| WO | 2017222738 | A1 | 12/2017 |

OTHER PUBLICATIONS

Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). (Proceedings of the ACM Conference on Computer Supported Cooperative Work, CSCW). https://doi.org/10.1145/2441776.2441847.

Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.

Hung, "An Evaluation of Aggregation Techniques in Crowdsourcing", Web Information Systems Engineering—WISE 2013, 2013, vol. 8181, ISBN : 978-3-642-41153-3.

Vaibhav B. Sinha et al., "Fast Dawid-Skene: A Fast Vote Aggregation Scheme for Sentiment Classification", Department of Computer Science and Engineering, Indian Institute of Technology Hyderabad, Telangana, India, 2018 https://arxiv.org/abs/1803.02781.

Hongwei Li et al., "Error Rate Bounds in Crowdsourcing Models", Department of Statistics, UC Berkeley, Department of EECS, UC Berkeley and Microsoft Research, Redmond, Jul. 10, 2013. https://arxiv.org/pdf/1307.2674.pdf.

Hongwei Li et al., "Error Rate Bounds and Iterative Weighted Majority Voting for Crowdsourcing", University of California, Berkeley, Nov. 15, 2014; https://arxiv.org/pdf/1411.4086.pdf.

Hideaki et al., "Analysis of Minimax Error Rate for Crowdsourcing and Its Application to Worker Clustering Model", https://arxiv.org/pdf/1802.04551.pdf Jun. 9, 2018.

(56) References Cited

OTHER PUBLICATIONS

Changbo et al., "Online Crowdsourcing", Cornell Univarsity, Feb. 8, 2019, https://arxiv.org/abs/1512.02393.

Vikas et al., "Eliminating Spammers and Ranking Annotators for Crowdsourced Labeling Tasks", Journal of Machine Learning Research 13 (2012) 491-518; http://www.jmlr.org/papers/volume13/raykar12a/raykar12a.pdf.

Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.

Lease, "On Quality Control and Machine Learning in Crowdsourcing", School of Information, University of Texas at Austin; (2011) https://www.ischool.utexas.edu/~ml/papers/lease-hcomp11.pdf.

Gadiraju, "Understanding Malicious Behavior in Crowdsourcing Platforms: The Case of Online Surveys", Apr. 18, 2015, http://eprints.whiterose.ac.uk/95877/1/Understanding%20malicious%20behaviour.pdf; https://doi.org/10.1145/2702123.2702443.

Carsten Eickhoff, "Cognitive Biases in Crowdsourcing", Dept. of Computer Science, Zurich, Switzerland, 2018, https://brown.edu/Research/AI/files/pubs/wsdm18.pdf.

Ece Kamar, "Identifying and Accounting for Task-Dependent Bias in Crowdsourcing", Microsoft Research, Redmond, WA, USA., (2015) http://erichorvitz.com/hcomp_2015_learning_bias.pdf.

Russian Search Report dated Jan. 15, 2021 issued in respect of the counterpart Russian Patent Application No. RU2019116267.

Russian Search Report dated Dec. 16, 2020 issued in respect of the counterpart Russian Patent Application No. RU2019111283.

Ustalov "Towards the Automated Collaborative Process for Language Resource Construction", Inzhenernyy vestnik Dona Journal, Issue No. 1(48), Published Mar. 20, 2018.

D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.

Khazankin, "QOS-Based Task Scheduling in Crowdsourcing Environments", Distributed Systems Group, Vienna University of Technology, Argentinierstrasse 8/184-1, A-1040 Vienna, Austria, 2011.

Yuen, "Task recommendation in crowdsourcing systems", Crowdkdd '12 Proceedings of The First International Workshop on Crowdsourcing and Data Mining, pp. 22-26, Beijing, China, Aug. 2012.

Office Action issued in respect of the related U.S. Appl. No. 16/852,512.

P. Radha et al. "An ER framework for e-contract modeling, enactment and monitoring", published on Oct. 2004, Data & Knowledge Engineering, vol. 51, Issue 1, pp. 31-58, https://doi.org/10.1016/j.datak.2004.03.006.

Thorsten et al. "A Collaborative Document Management Environment for Teaching and Learning", published on Jan. 2000, CVE, San Francisco, pp. 197-198 DOI:10.1145/351006.351044.

Office Action dated May 12, 2022 in respect of the related United States U.S. Appl. No. 16/832,095.

Notice of Allowance dated Jun. 1, 2022 in respect of the related United States U.S. Appl. No. 16/503,977.

Li et al.,"Crowdsourced Data Management: A Survey", Published on Apr. 19, 2017, IEEE Transactions on Knowledge and Data Engineering, pp. 1-23, DOI:10.1109/ICDE.2017.26.

Notice of Allowance dated Jun. 2, 2022 received in respect of a related U.S. Appl. No. 16/906,074.

\* cited by examiner

METHOD AND SYSTEM FOR DETERMINING RESULT FOR TASK EXECUTED IN CROWD-SOURCED ENVIRONMENT

CROSS-REFERENCE

The present application claims priority to Russian Patent Application No. 2019116267, entitled "Method and System for Determining Result for Task Executed in Crowd-Sourced Environment", filed May 27, 2019, the entirety of which is incorporated herein by reference.

FIELD

The present technology relates to methods and systems for determining a result of a task, and more particularly methods and systems for determining a result in a crowd-sourced environment.

BACKGROUND

Crowdsourcing platforms, such as the Amazon Mechanical Turk™, make it possible to coordinate the use of human intelligence to perform tasks that computers are currently unable to do in a shorter time and at a lower cost compared to that needed by professional assessors.

Generally speaking, the crowd-sourced platform includes two types of entities: the requesters who post jobs known as Human Intelligence Tasks (HITs), and performers who complete them in exchange for a monetary payment set by the requesters.

As assessors on the crowdsourcing platforms are generally non-professional and vary in levels of expertise, the obtained results also vary. Moreover, some assessors may be tempted to execute as much tasks as possible to increase their revenues, which may decrease the overall quality of the results.

United States Patent Application Publication No. 2015/0356489 A1 published Dec. 10, 2015, to Microsoft Technology Licensing LLC., and titled "Behavior-Based evaluation of Crowd Worker Quality" discloses the use of machine learning to identify behavioral factors upon which the evaluation can be based and then to learn how to utilize such behavioral factors to evaluate the HIT results generated by workers, as well as the workers themselves. The identification of behavioral factors, and the subsequent utilization thereof, is informed by the behavior of, and corresponding results generated by, a trusted set of workers. Results evaluated to have been improperly generated can be discarded or simply downweighted. Workers evaluated to be operating improperly can be removed or retrained.

United States Patent Application Publication No. 2018/0144283 A1 published May 24, 2018 to Definedcrowd LLC., and titled "Identifying Workers in a Crowdsourcing or Microtasking Platform who Perform Low-Quality Work and/or Are Really Automated Bots" discloses a facility for identifying workers in a crowdsourcing or micro-tasking platform who perform low-quality work and/or are really automated bots. To identify users who perform low-quality work and/or are really bots, the facility (1) measures the quality of at least a portion of the work done by each user, and (2) tracks the pattern of behavior performed by each user on the platform such as which work projects they select, the content of the responses, and the timing of each user interface interaction. The facility uses this information to build and maintain a model, such as a statistical model, that uses the pattern of a user's behavior to predict the level of quality of the user's work. Users for which the model predicts a low level of quality are flagged for manual review, or automatically suspended from working or from receiving payment.

SUMMARY

Non-limiting embodiments of the present technology have been developed based on developers' appreciation of at least one technical problem associated with the prior art solutions.

Developers of the present technology have appreciated certain technical drawbacks associated with the existing prior art systems and methods. For example, it is difficult to the properly assess whether a given assessor should be considered trustworthy or not (to determine whether to discard the result provided by the assessor), since the overall quality of the assessor may change over time. For example an assessor may well start as a "good" assessor, but subsequently degrade its quality over time, and vice-versa. As such, it is still difficult to properly assess the quality of a result without the need for a trusted human assessor to check the result.

In accordance with a first broad aspect of the present technology, there is provided a computer-implemented method for completing a task executed in a crowd-sourced environment, the task being of a given type of tasks. The method is executed by a server. The method comprises, at a training phase: transmitting, by the server, a training task to a plurality of users of the crowd-sourced environment, the training task being associated with a predefined training answer; acquiring, by the server, a plurality of training results responsive to the training task having been submitted by the plurality of users; acquiring, by the server, a respective user activity history associated with each user of the plurality of users, the respective user activity history including previously collected user interactions and characteristics of the user interactions within the crowd-sourced environment; for each of the plurality of training results, assigning a label value, the label value being one of a first label value and a second label value, the first label value being assigned to one or more training results corresponding to the predefined training answer, and the second label value being assigned to one or more training results not corresponding to the predefined training answer; generating, by the server, a set of triples of training data, each triples of training data being associated with a given training result of the plurality of training results, a given triples of training data including: the given training result; the user activity history associated with the given training result; the label value assigned to the given training result; training a machine learning algorithm (MLA), the training including: determining for each triples of training data, a set of features representative of a property of the triples of training data; and generating an inferred function based on the set of features, the inferred function being configured to determine a error parameter of a given result received from a given user to a given task, the error parameter representing a probability of the given result being an incorrect result, the error parameter being determined based on the user activity history of the given user.

In some non-limiting embodiments, the MLA is a first MLA. The method further comprises, at an in-use phase: acquiring, by the server, a result to the task received by a user, the task being different from the training task; acquiring, by the server, the user activity history associated with the user; determining, using the first MLA, the error parameter of the result based on the user activity history associated with the user; inputting the error parameter into a second MLA trained to generate a checking score, the checking score being indicative of a necessity to submit the result for additional verification; and in response to the checking score being above a predetermined threshold, transmitting the task and the result to a human assessor for additional verification.

In some non-limiting embodiments, the error parameter is further indicative of a necessity to submit the given result for additional verification.

In some non-limiting embodiments, the method further comprises, at an in-use phase: acquiring, by the server, a result to the task having been submitted by a user, the task being different from the training task; acquiring, by the server, the user activity history associated with the user; determining, using the MLA, the error parameter of the result based on the user activity history associated with the user; and in response to the error parameter being above a predetermined threshold, transmitting the task and the result to a human assessor for assigning the label to the result.

In some non-limiting embodiments, the method further comprises acquiring, by the server, the assigned label value from the human assessor; and in response to the assigned label value being indicative of the result being the incorrect result to the task, generating an additional training triple of data, the additional triple of data being different from the triple of training data included within the set of triples of training data, the additional triples of data comprising: the result; the user activity history associated with the user; the assigned label value; and training the MLA, the training including updating the inferred function based on the set of features representative of a property of the additional triples of data, for a subsequent determination of the error parameter.

In some non-limiting embodiments, the method further comprises receiving, by the server, a quality score associated with the user, the quality score being indicative of a reliability of the user; and in response to the assigned label value being indicative of the result being the incorrect answer to the task, lowering the quality score associated with the user.

In some non-limiting embodiments, the method further comprises upon determining that the lowered quality score is below a predetermined threshold, applying a restrictive action to the user, the restrictive action including suspending an account of the user within the crowd-sourced environment.

In some non-limiting embodiments, the given type of task is one of a labelling task and a picture uploading task.

In some non-limiting embodiments, in response to the assigned label value being indicative of the result being the incorrect answer to the task, the method further comprises re-training the MLA using an output of the comparison of the result and the assigned label.

In some non-limiting embodiments, the retraining is further based on features of the result and features associated with the human assessor.

In some non-limiting embodiments, features of the result are representative of the features associated with the incorrect answer and features associated with a correct result, respectively.

In some non-limiting embodiments, the task is associated with a list of executional instructions for the user to follow, and the correct result is based on the user following the executional instructions and the incorrect result is based on the user not following the executional instructions.

In some non-limiting embodiments, the features of the result are further representative of: the human assessor following the executional instructions and the human assessor not following the executional instructions.

In accordance with another broad aspect of the present technology, there is provided a system for completing a task executed in a crowd-sourced environment, the task being of a given type of tasks. The system comprises a server comprising a processor. The processor is configured to, at a training phase: transmit, by the server, a training task to a plurality of users of the crowd-sourced environment, the training task being associated with a predefined training answer; acquire, by the server, a plurality of training results responsive to the training task having been submitted by the plurality of users; acquire, by the server, a respective user activity history associated with each user of the plurality of users, the respective user activity history including previously collected user interactions and characteristics of the user interactions within the crowd-sourced environment; for each of the plurality of training results, assign a label value, the label value being one of a first label value and a second label value, the first label value being assigned to one or more training results corresponding to the predefined training answer, and the second label value being assigned to one or more training results not corresponding to the predefined training answer; generate, by the server, a set of triples of training data, each triples of training data being associated with a given training result of the plurality of training results, a given triples of training data including: the given training result; the user activity history associated with the given training result; the label value assigned to the given training result; train a machine learning algorithm (MLA), the training including: determine for each triples of training data, a set of features representative of a property of the triples of training data; and generate an inferred function based on the set of features, the inferred function being configured to determine a error parameter of a given result received from a given user to a given task, the error parameter representing a probability of the given result being an incorrect result, the error parameter being determined based on the user activity history of the given user.

In some non-limiting embodiments, the MLA is a first MLA. The processor is further configured to, at an in-use phase: acquire, by the server, a result to the task received by a user, the task being different from the training task; acquire, by the server, the user activity history associated with the user; determine, using the first MLA, the error parameter of the result based on the user activity history associated with the user; input the error parameter into a second MLA trained to generate a checking score, the checking score being indicative of a necessity to submit the result for additional verification; and in response to the checking score being above a predetermined threshold, transmit the task and the result to a human assessor for additional verification.

In some non-limiting embodiments, the error parameter is further indicative of a necessity to submit the given result for additional verification.

In some non-limiting embodiments, the processor is further configured to, at an in-use phase: acquire, by the server, a result to the task having been submitted by a user, the task being different from the training task; acquire, by the server, the user activity history associated with the user; determine, using the MLA, the error parameter of the result based on the user activity history associated with the user; and in response to the error parameter being above a predetermined threshold, transmit the task and the result to a human assessor for assigning the label to the result.

In some non-limiting embodiments, the processor is further configured to acquire, by the server, the assigned label value from the human assessor; and in response to the assigned label value being indicative of the result being the incorrect result to the task, generate an additional training triple of data, the additional triple of data being different from the triple of training data included within the set of triples of training data, the additional triples of data comprising: the result; the user activity history associated with the user; the assigned label value; and train the MLA, the training including updating the inferred function based on the set of features representative of a property of the additional triples of data, for a subsequent determination of the error parameter.

In some non-limiting embodiments, the processor is further configured to receive, by the server, a quality score associated with the user, the quality score being indicative of a reliability of the user; and in response to the assigned label value being indicative of the result being the incorrect answer to the task, lower the quality score associated with the user.

In some non-limiting embodiments, the processor is further configured to, upon determining that the lowered quality score is below a predetermined threshold, apply a restrictive action to the user, the restrictive action including suspending an account of the user within the crowd-sourced environment.

In some non-limiting embodiments, the given type of task is one of a labelling task and a picture uploading task.

In some non-limiting embodiments, in response to the assigned label value being indicative of the result being the incorrect answer to the task, the processor is further configured to re-train the MLA using an output of the comparison of the result and the assigned label.

In some non-limiting embodiments, the retraining is further based on features of the result and features associated with the human assessor.

In some non-limiting embodiments, features of the result are representative of the features associated with the incorrect answer and features associated with a correct result, respectively.

In some non-limiting embodiments, the task is associated with a list of executional instructions for the user to follow, and the correct result is based on the user following the executional instructions and the incorrect result is based on the user not following the executional instructions.

In some non-limiting embodiments, the features of the result are further representative of: the human assessor following the executional instructions and the human assessor not following the executional instructions.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
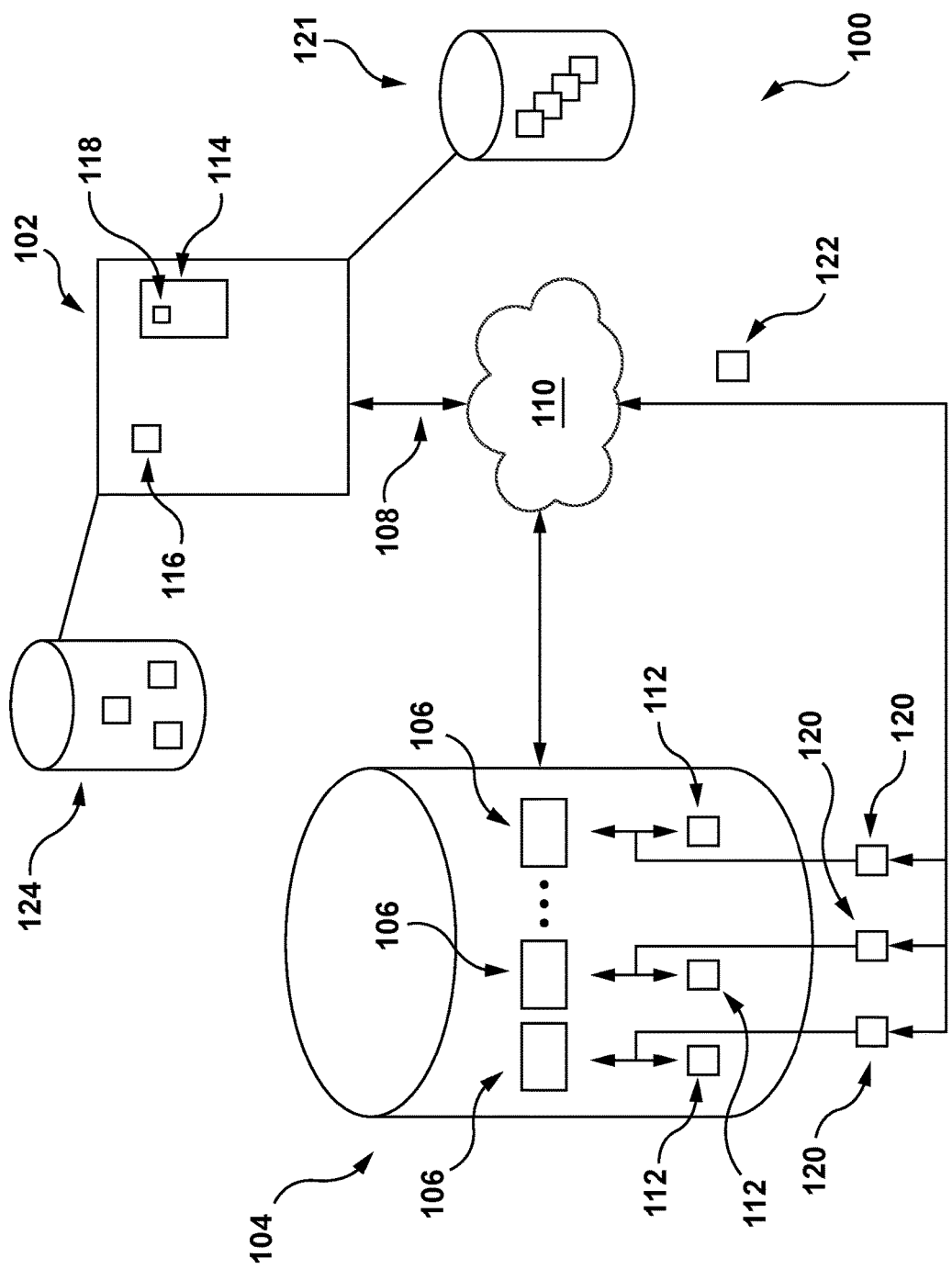
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication of identities of a plurality of human assessors 106, who have indicated their availability for completing at least one type of a crowd-sourced task and/or who have completed at least one crowd-sourced task in the past and/or registered for completing at least one type of the crowd-sourced task.

In some non-limiting embodiments of the present technology, the database 104 is under control and/or management of a provider of crow-sourced services, such as Yandex LLC of Lev Tolstoy Street, No. 16, Moscow, 119021, Russia. In alternative non-limiting embodiments, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that the database 104 can be stored at least in part at the server 102 and/or in any other one or more locations and/or could be managed at least in part by the server 102. In accordance with the non-limiting embodiments of the present technology, the database 104 comprises sufficient information associated with the identity of at least some of the plurality of human assessors 106 to allow an entity that has access to the database 104, such as the server 102, to assign and transmit one or more tasks to be completed by the one or more human assessors 106.

In accordance with the non-limiting embodiments of the present technology, the database 104 stores a quality score 112 associated with each of the human assessors 106. The quality score 112 of each given human assessor 106 indicates a reliability of a given result of a task completed by the given human assessor 106, or, in other words, an error rate of the given human assessor 106.

How the quality scores 112 of the human assessors 106 are determined is not limited. For example, the quality scores 112 may be determined based on a first plurality of "honeypot tasks" completed by each of the human assessors 106. In the present specification, the term "honeypot tasks" means a task the correct result of which is known prior to the task being submitted to the given human assessor 106 being tested/assessed for the quality score associated therewith, for completion thereof, which correct result is not provided to the one or more given human assessor 106 being assessed.

The results of the first plurality of honeypot tasks provided by the human assessors 106 are recorded in the database 104 in a suitable data structure (not depicted). For each given human assessor 106, a percentage of the first plurality of honeypot tasks that the given human assessor 106 completes correctly is calculated and recorded in the database 104 as the quality score 112 of the given human assessor 106. For example, if a given human assessor 106 completes twenty honeypot tasks and provides a result matching the corresponding known correct result to eighteen of the twenty honeypot tasks, then the quality score 112 of the given human assessor 106 is determined to be 18/20=0.9 (90%). Needless to say, the quality score may be expressed in a number of different formats.

In some non-limiting embodiments of the present technology, the quality scores 112 may be determined based on a statistical analysis of previously completed tasks and checks executed by a trusted human assessor.

At any given time, the plurality of human assessors 106 may comprise a different number of human assessors 106, such as fifty human assessors 106, who are available to complete tasks and who have corresponding quality scores 112 that are between 0% and 100%. The plurality of human assessors 106 could include more or fewer human assessors 106.

The server 102 can be implemented as a conventional computer server. In an example of a non-limiting embodiment of the present technology, the server 102 can be implemented as a Dell™ PowerEdge™ Server running the Microsoft™ Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations of the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments, the server 102 can be operated by an entity different from the one that operates the database 104.

In some non-limiting embodiments of the present technology, the server 102 is configured to execute a crowd-sourcing application 118. For example, the crowd-sourcing application 118 may be implemented as a crowd-sourcing platform such as Yandex.Toloka™ crowd-sourcing platform, or other proprietary or commercial crowd-sourcing platform.

To that end, the server 102 is communicatively coupled to a task database 121. In alternative non-limiting embodiments, the task database 121 may be communicatively coupled to the server 102 via the communication network 110. Although the task database 121 is illustrated schematically herein as a single entity, it is contemplated that the task database 121 may be configured in a distributed manner.

The task database 121 is populated with a plurality of human intelligence tasks (HITs, hereinafter "tasks") (not separately numbered). How the task database 121 is populated with the plurality of tasks is not limited. Generally speaking, one or more task requesters (not shown) may submit one or more tasks to be completed in the task database 121. In some non-limiting embodiments of the present technology, the one or more task requesters may specify the type of assessors the task is destined to, and/or a budget to be allocated to each human assessor 106 providing a correct result.

In some non-limiting embodiments of the present technology, a given task of the plurality of tasks could include a labelling task. For example, the labelling task corresponds to a task in which the human assessors 106 are asked to assign one or more labels to a text, a picture, or a document. For example, the labelling task may correspond to the human assessors 106 being provided with a picture, and asked to assign a first label indicative of a presence of a cat in the picture, and a second label indicative of an absence of the cat in the picture.

In some non-limiting embodiments of the present technology, a given task of the plurality of tasks could include a picture uploading task. For example, the picture uploading task corresponds to a task in which the human assessors 106 are asked to take a picture with specific instructions and upload it. For example, the picture uploading task may correspond to requiring the human assessors 106 to take a picture of the opening hours of stores and upload it, while respecting a set of instructions (described in detail below).

In some non-limiting embodiments of the present technology, a given task of the plurality of tasks could include a translation task. For example, the translation task corresponds to a task in which the human assessors 106 are asked to input a correct translation of a sentence in a source language (such as French) into a target language (such as English).

In some non-limiting embodiments of the present technology, a given task of the plurality of tasks could include a speech-to-text conversion task. For example, the speech-to-text conversion task may be the human assessors 106 being asked to input a correct textual representation of a recorded spoken utterance.

In some non-limiting embodiments of the present technology, a given task of the plurality of tasks could include an optical character recognition (OCR) task. For example, the OCR task corresponds to a task in which the human assessors 106 are asked to determine a correct textual representation of a text provided on a scanned image.

In accordance with the non-limiting embodiments of the present technology, the crowd-sourcing application 118 is configured to assign a given task to at least a subset of the plurality of human assessors 106, which have indicated their availability in the database 104.

The server 102 is configured to communicate with various entities via the communication network 110. Examples of the various entities include the database 104, respective electronic devices 120 of the human assessors 106, and other devices that may be coupled to the communication network 110. Accordingly, the crowd-sourcing application 118 is configured to retrieve the given task from the task database 121 and send the given task to a respective electronic device 120 used by the plurality of human assessors 106 to complete the given task, via the communication network 110 for example.

It is contemplated that any suitable file transfer technology and/or medium could be used for this purpose. It is also contemplated that the task could be submitted to the plurality of human assessors 106 via any other suitable method, such as by making the task remotely available to the plurality of human assessors 106.

In accordance with the non-limiting embodiments of the present technology, the server 102 is configured to receive a set of results of the task that has been completed by the plurality of human assessors 106. In accordance with the non-limiting embodiments of the present technology, the set of results could be received by the server 102 in one or more data packets 122 over the communication network 110 for example. It is contemplated that any other suitable data transfer means could be used.

In some non-limiting embodiments of the present technology, the server 102 is further communicatively coupled to a log database 124 via a dedicated link (not numbered). In alternative non-limiting embodiments, the log database 124 may be communicatively coupled to the server 102 via the communication network 110, without departing from the teachings of the present technology. Although the log database 124 is illustrated schematically herein as a single entity, it is contemplated that the log database 124 may be configured in a distributed manner.

The log database 124 is configured to store a user activity history (not separately numbered) associated with each of the plurality of human assessors 106. For example, the user activity history may correspond to the interactions between the human assessor 106 and the crowd-sourcing application 118, as well as parameters and characteristics of individual interaction. Examples of interactions, as well as parameters and characteristics of the various interactions include, but not limited to:

The time for the human assessor 106 to execute the task;
The human assessor changing the result before submitting the result;
The average time for the human assessor 106 to execute the task;
The type of task executed by the human assessor 106.

In some non-limiting embodiments of the present technology, the user activity history may be limited in time or in action. Just as an example, the user activity history may comprise actions executed by the human assessor 106 in the previous 24 hours, or the last 100 actions executed by the human assessor 106 on the crowd-sourcing application 118.

Although in the above description, the user activity history is explained as being different from the quality score 112, it is not limited as such. In some non-limiting embodiments of the present technology, it is contemplated that in addition to the actions executed by the human assessor 106, the user activity history may also comprise the associated quality score 112, or vice-versa.

Crowd-Sourcing Application 118

Figure 2:
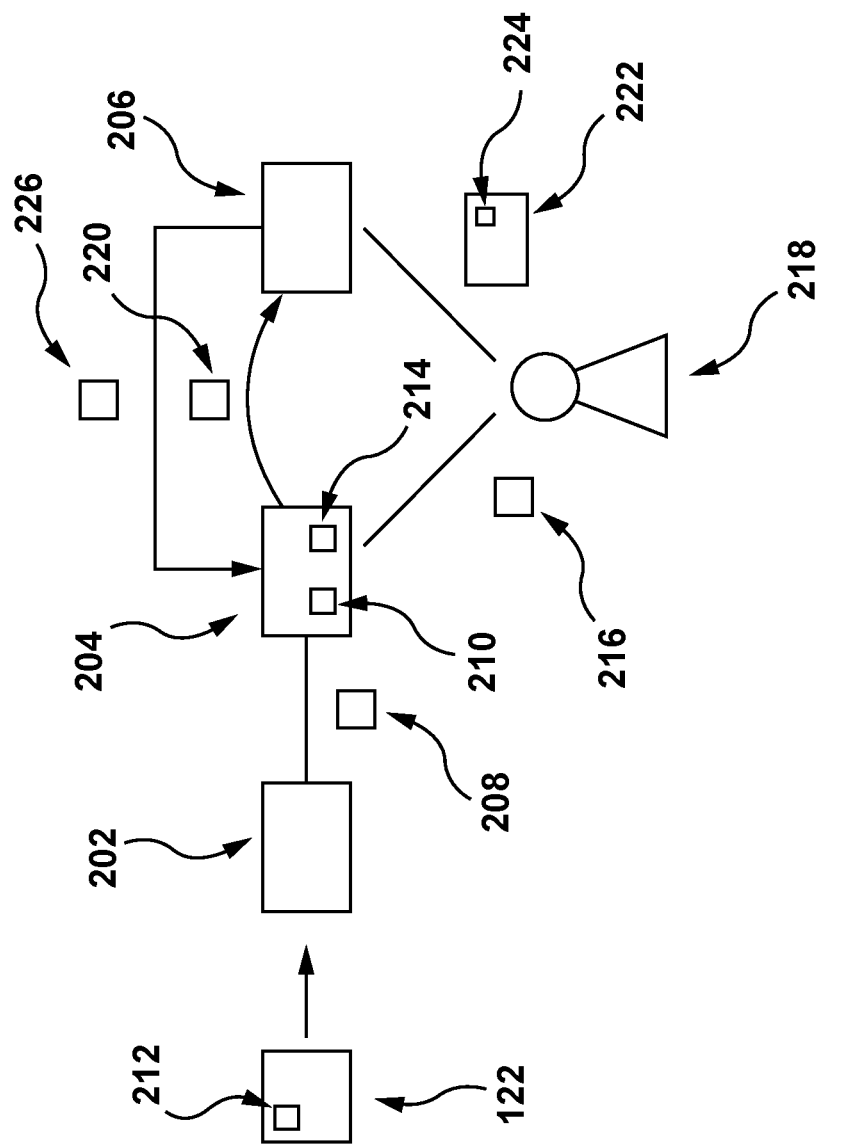
FIG. 2 depicts a schematic diagram of a process for determining a result for a task executed in a crowd-sourced environment.

With reference to FIG. 2, there is depicted a schematic diagram of a process for determining a result for a task executed in a crowd-sourced environment. The process for determining the result is executed by the crowd-sourcing application 118 (see FIG. 1) implemented in accordance with a non-limiting embodiment of the present technology. The crowd-sourcing application 118 executes (or otherwise has access to): a receiving routine 202, a verification routine 204, and an output routine 206.

In the context of the present specification, the term "routine" refers to a subset of the computer executable program instructions of the crowd-sourcing application 118 that is executable by the server processor 116 (the receiving routine 202, the verification routine 204, and the output routine 206). For the avoidance of any doubt, it should be expressly understood that the receiving routine 202, the verification routine 204, and the output routine 206 are illustrated herein as separate entities for ease of explanation of the processes executed by the crowd-sourcing application 118. It is contemplated that some or all of the receiving routine 202, the verification routine 204, and the output routine 206 may be implemented as one or more combined routines.

For ease of understanding the present technology, functionality of each of the receiving routine 202, the verification routine 204, and the output routine 206, as well as data and/or information processed or stored therein are described below.

Receiving Routine 202

The receiving routine 202 is configured to receive a result 212 from the electronic device 120 used by a given one of the plurality of human assessors 106, via the data packet 122. In some non-limiting embodiments of the present technology, the result 212 may be a word, a phrase, a sentence, a label or a picture.

For example, if the task is a labelling task, the result 212 comprises a label assigned by the human assessor 106.

For example, if the task is an OCR task, the result 212 comprises a textual answer inputted by the human assessor 106.

For example, if the task is a speech-to-text conversion task, the result 212 comprises a textual answer inputted by the human assessor 106 corresponding to the recorded spoken utterance.

For example, if the task is a translation task, the result 212 comprises a textual answer in a target language inputted by the human assessor 106 corresponding to a text in a source language.

Finally, if the task is a picture uploading task, the result 212 comprises a picture taken by the human assessors 106.

In some non-limiting embodiments of the present technology, the receiving routine 202 is configured to retrieve (i) a user activity history associated with the human assessor 106 from the log database 124, and (ii) a quality score 112 associated with the human assessor 106 from the database 104.

The receiving routine 202 is further configured to transmit a data packet 208 to the verification routine 204. The data packet 208 comprises (i) the result 212; (ii) the quality score 112 associated with the result 212; and (iii) the user activity history associated with the result 212.

Verification Routine 204

In response to receiving the data packet 208, the verification routine 204 is configured to execute the following functions.

The verification routine 204 is configured to execute a first machine learning algorithm (MLA) 210 trained to generate an error parameter for the result 212, based on the result 212 and the user activity history associated with the result 212.

The manner in which the error parameter is implemented is not limited, and may for example be representative of a probability of the result 212 being an incorrect result. In some non-limiting embodiments of the present technology, the error parameter may be expressed as a percentage value (from 0% to 100%) or on a scale (from 1 to 10). Needless to say, the error parameter may be expressed in a number of different formats. How the first MLA 210 is trained to determine the error parameter is explained below in more details.

Having determined the error parameter for the result 212, the verification routine 204 is further configured to execute a second MLA 214 trained to generate a checking score to the result 212, based on the error parameter.

The manner in which the checking score is implemented is not limited, and may for example be representative of a necessity to submit the result 212 for additional verification.

In some non-limiting embodiments of the present technology, the checking score may be expressed as a percentage value (from 0% to 100%) or on a scale (from 1 to 10). Needless to say, the checking score may be expressed in a number of different formats.

The verification routine 204 is further configured to determine if the checking score is above a predetermined threshold. How the predetermined threshold is determined is not limited, and may for example, be empirically determined.

In some non-limiting embodiments of the present technology, if the checking score is above the predetermined threshold, the verification routine 204 is configured to transmit a data packet 216 to a trusted assessor 218 for additional verification. The data packet 216 comprises the task and the result 212. For example, the trusted assessor 218 could correspond to a human assessor 106 whose quality score 112 exceeds 90%. In another example, the trusted assessor 218 could correspond to an employee associated with, or an administrator of the crowd-sourcing application 118.

In some non-limiting embodiments of the present technology, regardless of the checking score being above or below the predetermined threshold, the verification routine 204 is configured to transmit the data packet 216 to the trusted assessor 218, which comprises the task and the result 212.

Although the checking score has been explained as being determined using the first MLA 210 and the second MLA 214, it is contemplated that only a single MLA be used. For example, the function of the first MLA 210 and the second MLA 214 may be executed by a single MLA (not depicted). In another example, it is contemplated that the error parameter determined by the first MLA 210 be compared against a predetermined threshold to determine if the result 212 requires additional verification.

The verification routine 204 is further configured to transmit a data packet 220 to the output routine 206. The data packet 220 comprises the quality score 112 associated with the result 212.

Output Routine 206

The output routine 206 is configured to receive two data packets, namely the data packet 220 received from the verification routine 204 which comprises the quality score 112 associated with the result 212, and a data packet 222 from the trusted assessor 218.

The data packet 222 comprises a label 224 assigned by the trusted assessor 218, which is indicative of the result 212 corresponding to a correct answer to the task, or being an incorrect answer to the task.

In some non-limiting embodiments of the present technology, in response to the label 224 being indicative that the result 212 corresponds to the correct answer to the task, the output routine 206 is configured to process the task as being completed. Accordingly, the output routine 206 is then configured to calculate and issue a reward to the human assessor 106 who has submitted the result 212.

Accordingly, the output routine 206 is further configured to increase the quality score 112 of the human assessor who has submitted the result 212 labelled as the correct answer to the task.

In some non-limiting embodiments of the present technology, in response to the label 224 being indicative that the result 212 corresponds to the incorrect answer to the task, the output routine 206 is configured to discard the result 212.

In some non-limiting embodiments of the present technology, the output routine 206 is further configured to decrease the quality score 112 of the human assessor 106 who has submitted the result 212 being the incorrect answer to the task.

In some non-limiting embodiments of the present technology, if the decreased quality score 112 of the human assessor 106 is below a predetermined threshold, the output routine 206 may be configured to perform a restrictive action. For example, the restrictive action may refer to at least one of: (i) suspending an account of the human assessor 106 within the crowd-sourcing platform, and (ii) limiting the use of the account, such as the number of tasks available to the human assessor 106.

In some non-limiting embodiments of the present technology, the output routine 206 is further configured to transmit a data packet 226 to the verification routine 204. The data packet 226 comprises the label 224, the result 212 and the user activity history associated with the result 212.

Training the First MLA 210

Figure 3:
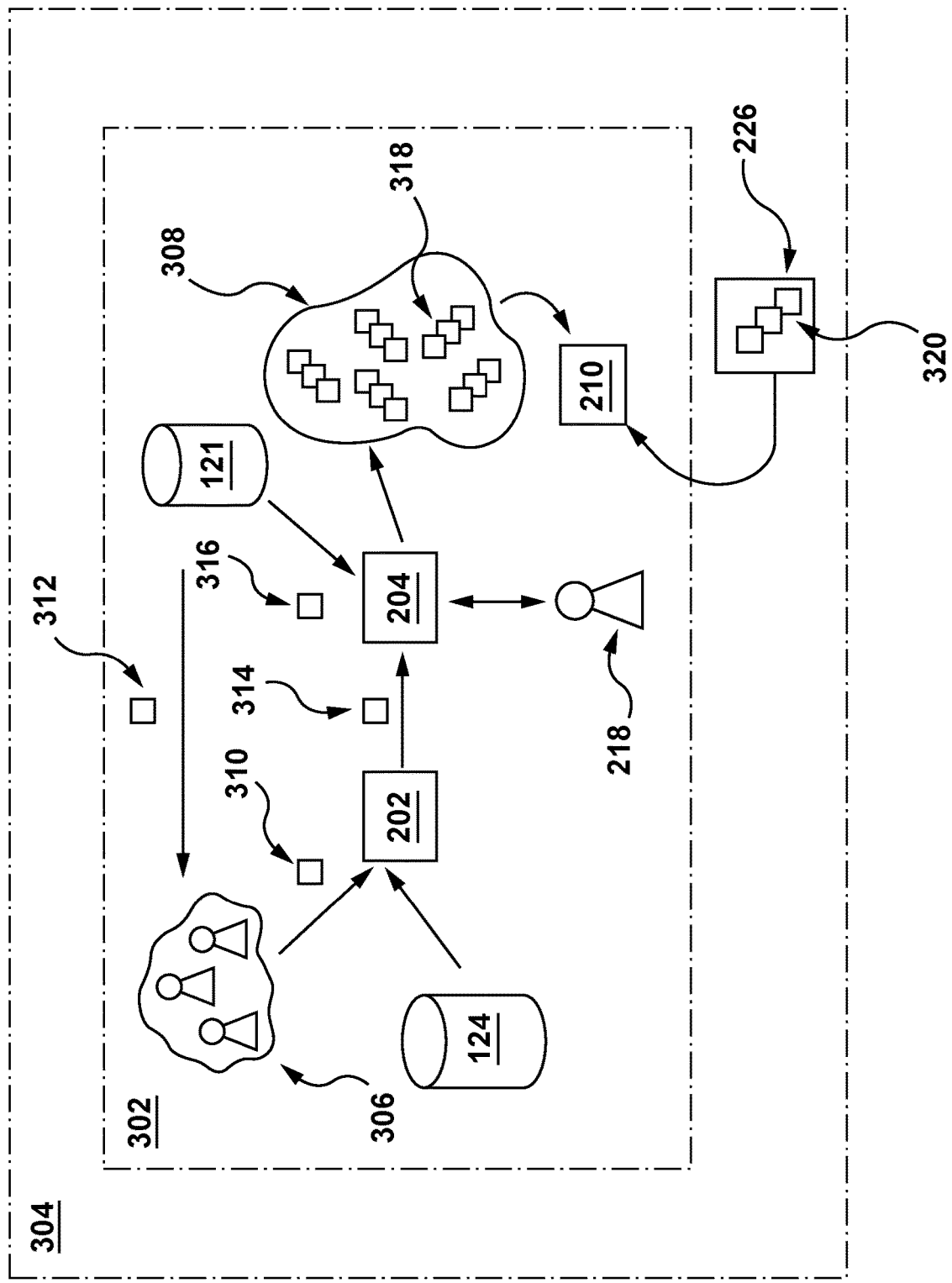
FIG. 3 depicts a diagram of a method for generating a set of training data and training the first MLA executable within the system of FIG. 1.

With reference to FIG. 3, there is depicted a diagram of a method for generating a set of training data and training the first MLA 210.

For better understanding the underlying concepts of the present technology, it should be understood that the training of the first MLA 210 can be broadly separated into a first training period 302 and a second training period 304. In the first training period 302, the first MLA 210 is trained prior to being used in an in-use phase. In the second training period 304, the first MLA is trained during the in-use phase.

The first training period 302 can be broadly separated into a first phase and a second phase. In the first phase, the training input data (discussed below) is generated. In the second phase, the first MLA 210 is trained using the training input data. Moreover, although the steps of training the first MLA 210 are explained as being executed by the verification routine 204, it is not limited as such.

In the first phase, the receiving routine 202 is configured to receive a plurality of training results 310 from a plurality of training assessors 306 submitting a training result for a training task 312 originating from the task database 121.

In some non-limiting embodiments of the present technology, the plurality of training assessors 306 may include some or all of the plurality of human assessors 106 (see FIG. 1).

In some non-limiting embodiments of the present technology, a given training result of the plurality of training results 310 may be a word, a phrase, a sentence, a label, and a picture.

The receiving routine 202 is configured to access the log database 124 to retrieve the user activity history associated with each training assessors 306 and associate it with the received associated training result.

The receiving routine 202 is then configured to transmit a data packet 314 to the verification routine 204. The data packet 314 comprises (i) the plurality of training results 310 and (ii) the user activity history associated with each of the training result of the plurality of training results 310.

In response to receiving the data packet 314, the verification routine 204 is configured to execute the following functions.

Firstly, the verification routine 204 is configured to assign a label to each of the training result from the plurality of training results 310. More precisely, the verification routine 204 is configured to assign a label indicative of whether the training result is a correct result or an incorrect result to the training task 312.

How the label is assigned is not limited. For example, the training task 312 may be associated with a predetermined answer 316 which is transmitted to the verification routine 204. The verification routine 204 is then configured to compare each training result with the predetermined answer 316 and assign the label accordingly.

In another example, if the training task 312 is a picture uploading task, the verification routine 204 may be configured to transmit the plurality of training results 310 to the trusted assessor 218 for labelling the plurality of results.

Having labelled each of the training result of the plurality of training results 310, the verification routine 204 is configured to generate a set of triples of training data 308. The set of triples of training data 308 comprises a first triple of training data 318, a second triple of training data (not numbered), a third triple of training data (not numbered), a fourth triple of training data (not numbered), and a fifth triple of training data (not numbered). Needless to say, although only five triples of training data is included within the set of triples of training data 308, it is not limited as such. It is contemplated that the set of triples of training data 308 may include more or less than five triples of training data.

Each triple of training data within the set of triples of training data 308 is associated with a given training result of the plurality of training results 310.

Let us assume for example, that the training task 312 is a picture uploading task.

Figure 4:
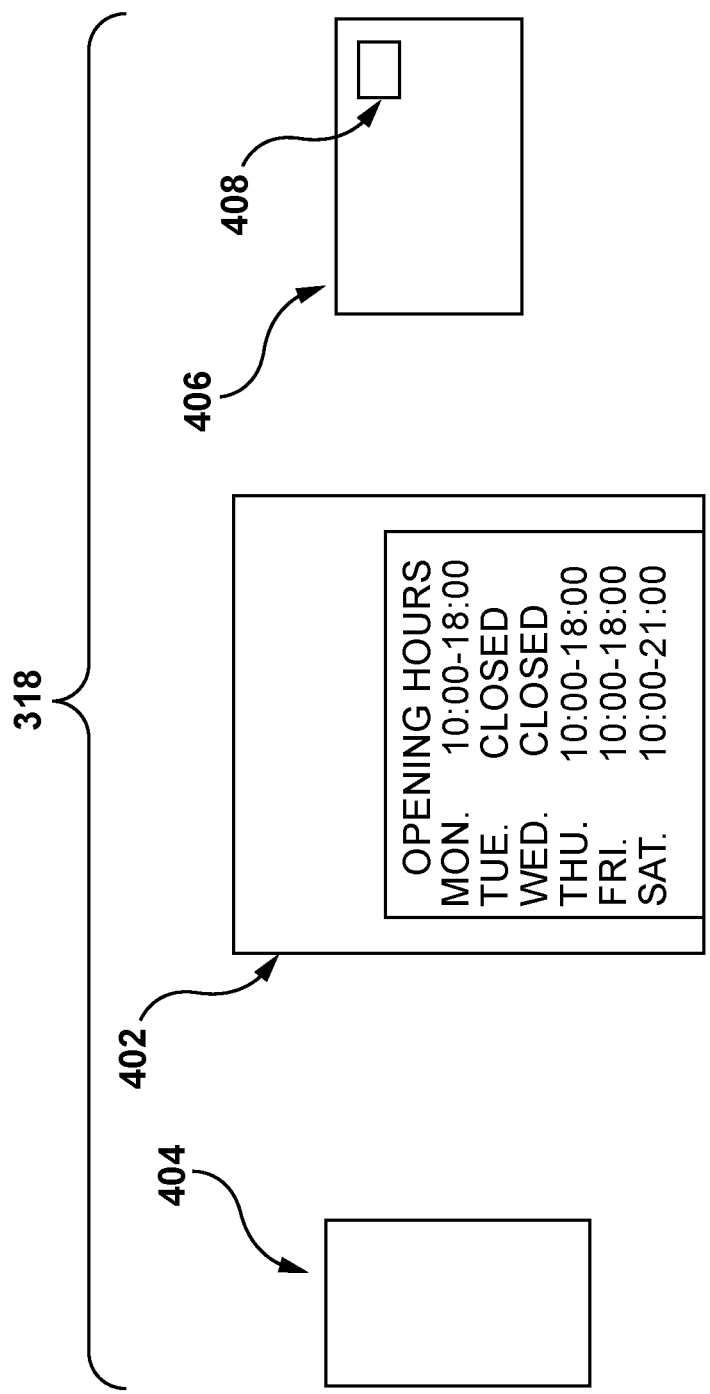
FIG. 4 depicts a schematic diagram of a triple of training data for training the first MLA during a training phase of FIG. 3.

Briefly referring to FIG. 4, there is depicted a schematic diagram of the first triple of training data 318 for training the first MLA 210 during the first training period 302.

The first triple of training data 318 includes a training result 402, the user activity history 404 associated with the training result 402, and a training label 406.

In some non-limiting embodiments of the present technology, the training label 406 is a binary label. For example, the training label 406 corresponds to a binary label value of 0 if the training result 402 is an incorrect answer to the training task 312, and the training label 406 corresponds to a binary label value of 1 if the training result 402 is a correct answer to the training task 312.

As briefly mentioned above, the picture-uploading task may be associated with a list of executional instructions for the plurality of training assessors 306 to follow. For example, where the training task 312 is to upload a picture of a business sign, such as an "opening hours" sign, the list of executional instructions may include, but not limited to:

The business sign must be centered within the picture;
The symbols on the business sign must be clearly visible;
The business sign must be entirely visible; and
The picture must be colorized.

As illustrated in FIG. 4, while the training result 402 corresponds to a business sign, the executional instructions have not been followed by the training assessor. More precisely, only a portion of the business sign is displayed in the training result 402, contrary to the requirement of showing the business sign in its entirety.

Accordingly, the trusted assessor 218 has assigned the training label 406, which is indicative that the training result 402 is an incorrect training result to the training task 312 (i.e. a binary label value of 0).

In some non-limiting embodiments of the present technology, the training label 406 further comprises a mistake indication 408. More precisely, in addition to simply indicating whether the training result 402 is or is not the correct answer to the training task 312, the training label 406 may include the mistake indication 408, which is further indicative of the reason why the training result 402 is not the correct answer to the training task 312.

For example, in the present example, the mistake indication 408 is indicative that the training result 402 did not meet the requirement of uploading a picture where the business sign is visible in its entirety.

Although in the above explanation, the mistake indication 408 is associated with the training label 406, it is not limited as such. In some non-limiting embodiments of the present technology, the training label 406 may be implemented as a multivalent label, where each label is indicative of both the correctness/incorrectness of the training result and the reason for being incorrect.

Returning to FIG. 3, the set of triples of training data 308 is inputted into the first MLA 210. For each triple of training data (such as the first triple of training data 318) with the set of triples of training data 308, the first MLA 210 comprises a training logic to determine a set of features associated with the training result (such as the training result 402 shown in FIG. 4), the associated user activity history (such as the user activity history 404 shown in FIG. 4), and the assigned label (such as the training label 406).

In some non-limiting embodiments of the present technology, the set of features are representative of the properties of the training result and the associated user activity history for each triple of training data included within the set of triples of training data 308.

In some non-limiting embodiments of the present technology, the set of features are representative of the properties of the training result, the associated user activity history, and the mistake indication, for each triple of training data included within the set of triples of training data 308.

Once the set of features for each triple of training data included within the set of triples of training data 308 has been determined, the first MLA 210 is configured to analyze the set of features.

More precisely, recalling that each triple of training data contains a label indicative of the training result being a correct or incorrect result to the training task 312, the first MLA 210 is configured to learn, what set of features is indicative of the training result being incorrect.

Accordingly, the first MLA 210 is configured to generate an inferred function which is capable of assigning the error parameter to the result 212 (see FIG. 2) during the in-use phase, based on the set of features associated with the result 212 and the associated user activity history.

Needless to say, although the above explanation of the training of the first MLA 210 has been made with reference to only the first triple of training data 318, it is done so for ease of understanding. It should be explicitly understood that the training of the first MLA 210 is done iteratively using the remaining triples of training data included in the set of triples of training data 308.

Now, having described the manner in which the first MLA 210 is prepared during the first training period 302 (i.e. prior to the in-use phase), attention will now be turned to the second training period 304.

In the second training period 304, the first MLA 210 is further retrained using a triple of data 320 generated during the in-use phase. More precisely, the triple of data 320 comprises the label 224, the result 212 and the user activity history associated with the result 212 that is transmitted to the verification routine 204 by the output routine 206 via the data packet 226.

Let us assume for example, that the task executed during the in-use phase (see FIG. 2) is a picture-uploading task.

Figure 5:
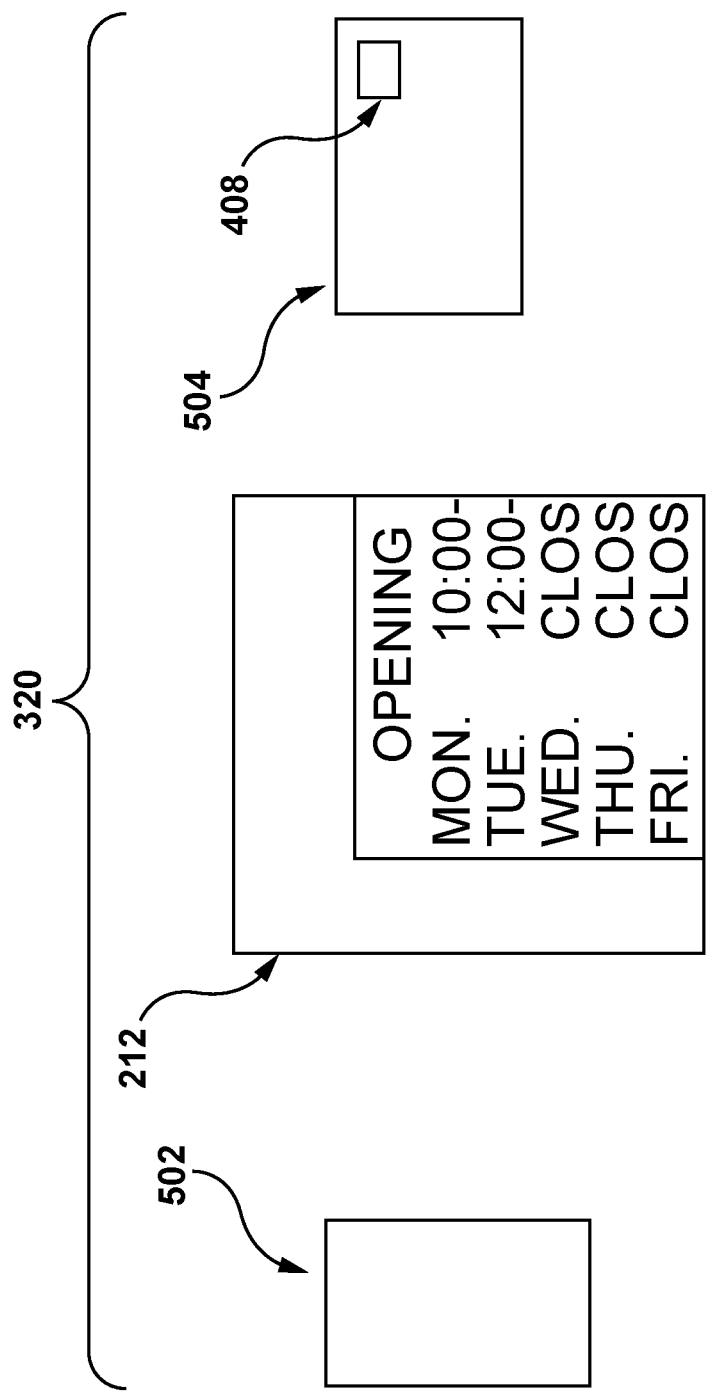
FIG. 5 depicts a schematic diagram of a triple of training data for training the first MLA during an in-use phase of FIG. 3.

Referring now at FIG. 5, there is depicted a schematic diagram of the triple of data 320 for training the first MLA 210 during the second training period 304.

The triple of data 320 includes the result 212, the user activity history 502 associated with the result 212 and a label 504.

As illustrated in FIG. 5, while the result 212 corresponds to a business sign as per the task, the executional instructions have not been followed by the human assessor 106. More precisely, only a portion of the business sign is displayed in the result 212, contrary to the requirement of showing the business sign in its entirety.

Accordingly, the trusted assessor 218 has assigned the label 504 indicative that the result 212 is an incorrect result to the task.

In some non-limiting embodiments of the present technology, the label 504 further comprises the mistake indication 408 indicative that the result 212 did not meet the requirement of uploading a picture where the business sign is entirely visible.

Returning to FIG. 3, the triple of data 320 is inputted into the first MLA 210 to determine the set of features associated with the result 212, the associated user activity history 502 and the label 504.

In some non-limiting embodiments of the present technology, the set of features are representative of the properties of the result 212 and the associated user activity history 502.

In some non-limiting embodiments of the present technology, the set of features are representative of the properties of the result 212, the associated user activity history 502, and the mistake indication 408.

Once the set of features for the triple of data 320 has been determined, the first MLA 210 is configured to analyze the set of features to update the inferred function for a subsequent determination of the error parameter during the in-use phase.

Needless to say, although there is only depicted a single triple of data 320 within the second training period 304, it is done so for ease of understanding. It should be explicitly understood that the retraining of the first MLA 210 is done iteratively using a plurality of different triples of data generated during the in-use phase.

The various non-limiting embodiments of the present technology may allow the determining the result of the task executed in a crowd-sourcing environment.

Figure 6:
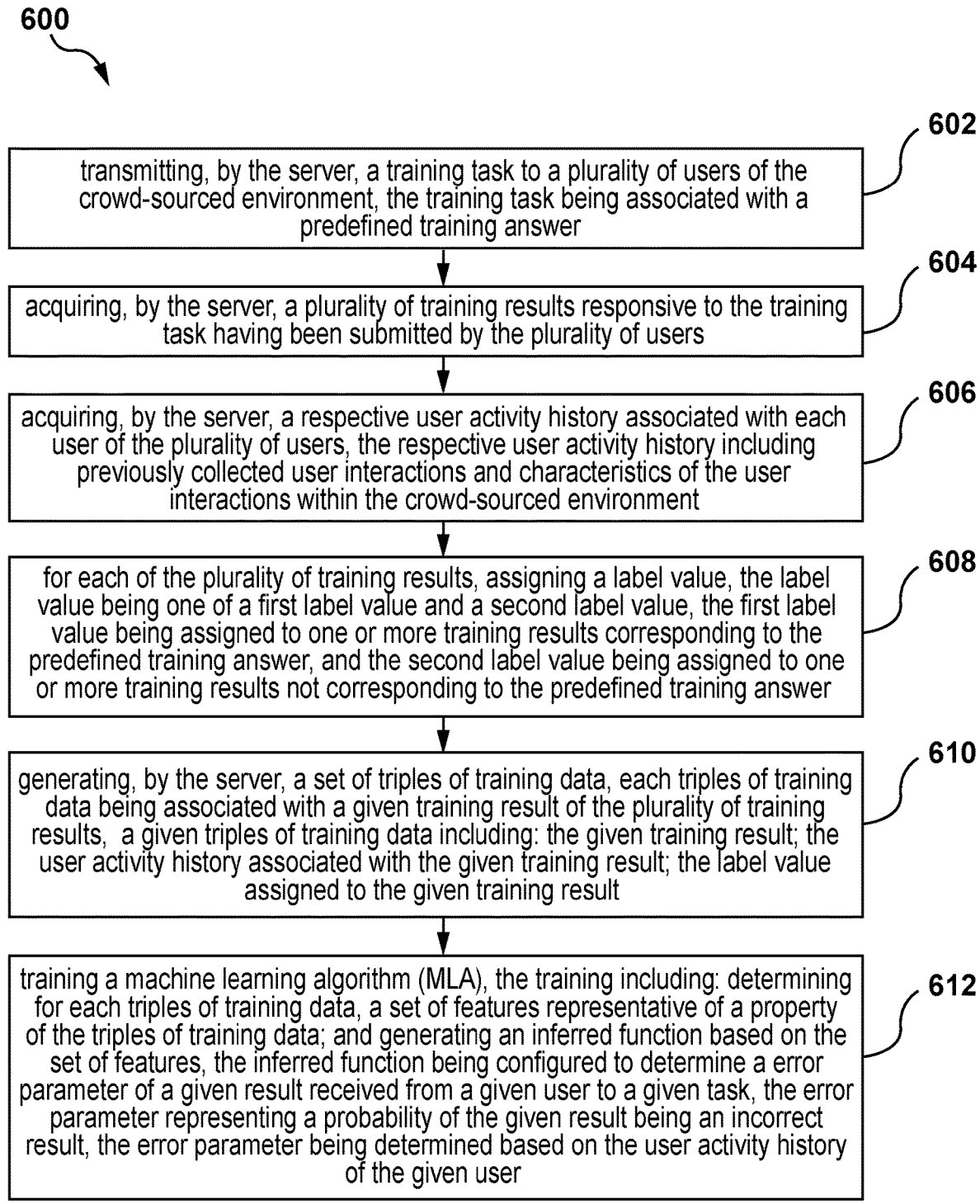
FIG. 6 depicts a block diagram of a flow chart of a method for determining a result of a task executed in a crowd-sourced environment.

Given the architecture and examples provided herein above, it is possible to execute a computer-implemented method for determining a result of a task executed in a crowd-sourced environment. With reference to FIG. 6, there is provided a flow chart of a method 600, the method 600 being executable in accordance with non-limiting embodiments of the present technology. The method 600 can be executed by the server 102.

Step 602: transmitting, by the server, a training task to a plurality of users of the crowd-sourced environment, the training task being associated with a predefined training answer The method 600 starts at step 602, where the server 102 transmits the training task 312 to a plurality of training assessors 306 (see FIG. 3).

Step 604: acquiring, by the server, a plurality of training results responsive to the training task having been submitted by the plurality of users At step 604, the receiving routine 202 is configured to receive the plurality of training results 310 from the plurality of training assessors 306.

Step 606: acquiring, by the server, a respective user activity history associated with each user of the plurality of users, the respective user activity history including previously collected user interactions and characteristics of the user interactions within the crowd-sourced environment At step 606, the receiving routine 202 is configured to retrieve, (i) a user activity history associated with the human assessor 106 from the log database 124, and (ii) a quality score 112 associated with the human assessor 106 from the database 104.

The receiving routine 202 is then configured to transmit the data packet 314 to the verification routine 204. The data packet 314 comprises (i) the plurality of training results 310 and (ii) the user activity history associated with each of the training result of the plurality of training results 310.

Step 608: for each of the plurality of training results, assigning a label value, the label value being one of a first label value and a second label value, the first label value being assigned to one or more training results corresponding to the predefined training answer, and the second label value being assigned to one or more training results not corresponding to the predefined training answer At step 608, in response to receiving the data packet 314, the verification routine 204 is configured to assign the label to each of the training result from the plurality of training results 310. More precisely, the verification routine 204 is configured to assign a label indicative of whether the training result is a correct result or an incorrect result to the training task 312.

How the label is assigned is not limited. For example, if the training task 312 is a labelling task, the training task 312 may be associated with a predetermined answer 316 which is transmitted to the verification routine 204. The verification routine 204 is then configured to compare each training result with the predetermined answer 316 and assign the label accordingly.

In another example, if the training task 312 is a picture uploading task, the verification routine 204 may be configured to transmit the plurality of training results 310 to the trusted assessor 218 for labelling the plurality of results.

Step 610: generating, by the server, a set of triples of training data, each triples of training data being associated with a given training result of the plurality of training results, a given triples of training data including: the given training result; the user activity history associated with the given training result; the label value assigned to the given training result Having labelled each of the training result of the plurality of training results 310, the verification routine 204 is configured to generate the set of triples of training data 308. The set of triples of training data 308 comprises the first triple of training data 318, the second triple of training data, the third triple of training data, the fourth triple of training data, and the fifth triple of training data. Needless to say, although only five triples of training data is included within the set of triples of training data 308, it is not limited as such. It is contemplated that the set of triples of training data 308 may include more or less than five triples of training data.

Each triple of training data within the set of triples of training data 308 is associated with a given training result of the plurality of training results 310.

Let us assume for example, that the training task 312 is a picture uploading task, where the user is tasked with uploading a picture of a business sign, such as an "opening hours" sign.

Briefly referring to FIG. 4, there is depicted a schematic illustration of the first triple of training data 318.

As illustrated in FIG. 4, while the training result 402 corresponds to a business sign, the executional instructions have not been followed by the training assessor. More precisely, only a portion of the business sign is displayed in the training result 402, contrary to the requirement of showing the business sign in its entirety.

Accordingly, the trusted assessor 218 has assigned the training label 406, which is indicative that the training result 402 is an incorrect training result to the training task 312 (i.e. a binary label value of 0).

In some non-limiting embodiments of the present technology, the training label 406 further comprises a mistake indication 408. More precisely, in addition to simply telling whether the training result 402 is or is not the correct answer to the training task 312, the training label 406 may include the mistake indication 408 which is further indicative of the reason why the training result 402 is not the correct answer to the training task 312.

For example, in the present example, the mistake indication 408 is indicative that the training result 402 did not meet the requirement of uploading a picture where the business sign is entirely visible.

Although in the above explanation, the mistake indication 408 is associated with the training label 406, it is not limited as such. In some non-limiting embodiments of the present technology, the training label 406 may be implemented as a multivalent label, where each label is indicative of both the correctness/incorrectness of the training result and the reason for being incorrect.

Step 612: training a machine learning algorithm (MLA), the training including: determining for each triples of training data, a set of features representative of a property of the triples of training data; and generating an inferred function based on the set of features, the inferred function being configured to determine a error parameter of a given result received from a given user to a given task, the error parameter representing a probability of the given result being an incorrect result, the error parameter being determined based on the user activity history of the given user Returning to FIG. 3, the set of triples of training data 308 is inputted into the first MLA 210. For each triple of training data (such as the first triple of training data 318) within the set of triples of training data 308, the first MLA 210 comprises the training logic to determine a set of features associated with the training result (such as the training result 402 shown in FIG. 4), the associated user activity history (such as the user activity history 404 shown in FIG. 4), and the assigned label (such as the training label 406).

In some non-limiting embodiments of the present technology, the set of features are representative of the properties of the training result and the associated user activity history for each triple of training data included within the set of triples of training data 308.

In some non-limiting embodiments of the present technology, the set of features are representative of the properties of the training result, the associated user activity history, and the mistake indication, for each triple of training data included within the set of triples of training data 308.

Once the set of features for each triple of training data included within the set of triples of training data 308 has been determined, the first MLA 210 is configured to analyze the set of features.

More precisely, recalling that each triple of training data contains a label indicative of the training result being a correct or incorrect result to the training task 312, the first MLA 210 is configured to learn, what set of features is indicative of the training result being incorrect.

Accordingly, the first MLA 210 is configured to generate the inferred function which is capable of assigning the error parameter to the result 212 (see FIG. 2) during the in-use phase, based on the set of features associated with the result 212 and the associated user activity history.

The method 600 then terminates.

It should be apparent to those skilled in the art that at least some embodiments of the present technology aim to expand a range of technical solutions for addressing a particular technical problem encountered by the conventional crowd-sourcing technology, namely determining a result to a task within the crowd-sourcing environment.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A method for completing a task executed in a crowd-sourced environment, the task being of a given type of tasks, the method being executed by a server, the method comprising, at a training phase:
   transmitting, by the server, a training task to a plurality of users of the crowd-sourced environment, the training task being associated with a predefined training answer;
   acquiring, by the server, a plurality of training results responsive to the training task having been submitted by the plurality of users;
   acquiring, by the server, a respective user activity history associated with each user of the plurality of users, the respective user activity history including previously collected user interactions and characteristics of the user interactions within the crowd-sourced environment;
   for each of the plurality of training results, assigning a label value, the label value being one of a first label value and a second label value, the first label value being assigned to one or more training results corresponding to the predefined training answer, and the second label value being assigned to one or more training results not corresponding to the predefined training answer;
   generating, by the server, a set of triples of training data, each triples of training data being associated with a given training result of the plurality of training results, a given triples of training data including:
      the given training result;
      the user activity history associated with the given training result;
      the label value assigned to the given training result;
   training a machine learning algorithm (MLA), the training including:
      determining for each triples of training data, a set of features representative of a property of the triples of training data; and
      generating an inferred function based on the set of features, the inferred function being configured to determine a error parameter of a given result received from a given user to a given task, the error parameter representing a probability of the given result being an incorrect result, the error parameter being determined based on the user activity history of the given user.

2. The method of claim 1, wherein the MLA is a first MLA, the method further comprising:
   at an in-use phase:
      acquiring, by the server, a result to the task received by a user, the task being different from the training task;
      acquiring, by the server, the user activity history associated with the user;
      determining, using the first MLA, the error parameter of the result based on the user activity history associated with the user;
      inputting the error parameter into a second MLA trained to generate a checking score, the checking score being indicative of a necessity to submit the result for additional verification; and
      in response to the checking score being above a predetermined threshold, transmitting the task and the result to a human assessor for additional verification.

3. The method of claim 1, wherein the error parameter is further indicative of a necessity to submit the given result for additional verification.

4. The method of claim 3, the method further comprising:
   at an in-use phase:
      acquiring, by the server, a result to the task having been submitted by a user, the task being different from the training task;
      acquiring, by the server, the user activity history associated with the user;
      determining, using the MLA, the error parameter of the result based on the user activity history associated with the user; and
      in response to the error parameter being above a predetermined threshold, transmitting the task and the result to a human assessor for assigning the label to the result.

5. The method of claim 4, the method further comprising:
   acquiring, by the server, the assigned label value from the human assessor; and
   in response to the assigned label value being indicative of the result being the incorrect result to the task, generating an additional training triple of data, the additional triple of data being different from the triple of training data included within the set of triples of training data, the additional triples of data comprising:
      the result;
      the user activity history associated with the user;
      the assigned label value; and
   training the MLA, the training including updating the inferred function based on the set of features representative of a property of the additional triples of data, for a subsequent determination of the error parameter.

6. The method of claim 5, further comprising:
   receiving, by the server, a quality score associated with the user, the quality score being indicative of a reliability of the user; and
   in response to the assigned label value being indicative of the result being the incorrect answer to the task, lowering the quality score associated with the user.

7. The method of claim 6, further comprising:

upon determining that the lowered quality score is below a predetermined threshold, applying a restrictive action to the user, the restrictive action including suspending an account of the user within the crowd-sourced environment.

8. The method of claim 1, wherein the given type of task is one of a labelling task and a picture uploading task.

9. The method of claim 5, wherein in response to the assigned label value being indicative of the result being the incorrect answer to the task, the method further comprises re-training the MLA using an output of the comparison of the result and the assigned label.

10. The method of claim 9, wherein the retraining is further based on features of the result and features associated with the human assessor.

11. The method of claim 10, features of the result are representative of the features associated with the incorrect answer and features associated with a correct result, respectively.

12. The method of claim 11, wherein the task is associated with a list of executional instructions for the user to follow, and wherein the correct result is based on the user following the executional instructions and the incorrect result is based on the user not following the executional instructions.

13. The method of claim 12, wherein the features of the result are further representative: the human assessor following the executional instructions and the human assessor not following the executional instructions.

14. A system for completing a task executed in a crowd-sourced environment, the task being of a given type of tasks, the system comprising a server, the server comprising a processor configured to, in a training phase:
   transmit, by the server, a training task to a plurality of users of the crowd-sourced environment, the training task being associated with a predefined training answer;
   acquire, by the server, a plurality of training results responsive to the training task having been submitted by the plurality of users;
   acquire, by the server, a respective user activity history associated with each user of the plurality of users, the respective user activity history including previously collected user interactions and characteristics of the user interactions within the crowd-sourced environment;
   for each of the plurality of training results, assign a label value, the label value being one of a first label value and a second label value, the first label value being assigned to one or more training results corresponding to the predefined training answer, and the second label value being assigned to one or more training results not corresponding to the predefined training answer;
   generate, by the server, a set of triples of training data, each triples of training data being associated with a given training result of the plurality of training results, a given triples of training data including:
      the given training result;
      the user activity history associated with the given training result;
      the label value assigned to the given training result;
   train a machine learning algorithm (MLA), the training including:
      determining for each triples of training data, a set of features representative of a property of the triples of training data; and
   generate an inferred function based on the set of features, the inferred function being configured to determine a error parameter of a given result received from a given user to a given task, the error parameter representing a probability of the given result being an incorrect result, the error parameter being determined based on the user activity history of the given user.

15. The system of claim 14, wherein the MLA is a first MLA, the processor is further configured to:
   at an in-use phase:
      acquire, by the server, a result to the task received by a user, the task being different from the training task;
      acquire, by the server, the user activity history associated with the user;
      determine, using the first MLA, the error parameter of the result based on the user activity history associated with the user;
      input the error parameter into a second MLA trained to generate a checking score, the checking score being indicative of a necessity to submit the result for additional verification; and
      in response to the checking score being above a predetermined threshold, transmit the task and the result to a human assessor for additional verification.

16. The system of claim 14, wherein the error parameter is further indicative of a necessity to submit the given result for additional verification.

17. The system of claim 16, the processor being further configured to:
   at an in-use phase:
      acquire, by the server, a result to the task having been submitted by a user, the task being different from the training task;
      acquire, by the server, the user activity history associated with the user;
      determine, using the MLA, the error parameter of the result based on the user activity history associated with the user; and
      in response to the error parameter being above a predetermined threshold, transmit the task and the result to a human assessor for assigning the label to the result.

18. The system of claim 17, the processor being further configured to:
   acquire, by the server, the assigned label value from the human assessor; and
   in response to the assigned label value being indicative of the result being the incorrect result to the task, generate an additional training triple of data, the additional triple of data being different from the triple of training data included within the set of triples of training data, the additional triples of data comprising:
      the result;
      the user activity history associated with the user;
      the assigned label value; and
   train the MLA, the training including updating the inferred function based on the set of features representative of a property of the additional triples of data, for a subsequent determination of the error parameter.

19. The system of claim 17, the processor being further configured to:
   receive, by the server, a quality score associated with the user, the quality score being indicative of a reliability of the user; and
   in response to the assigned label value being indicative of the result being the incorrect answer to the task, lower the quality score associated with the user.

20. The system of claim 19, the processor being further configured to:

upon determining that the lowered quality score is below a predetermined threshold, apply a restrictive action to the user, the restrictive action including suspending an account of the user within the crowd-sourced environment.

* * * * *